United States Patent [19]

Lang et al.

[11] Patent Number: 4,632,344

[45] Date of Patent: Dec. 30, 1986

[54] ADJUSTABLE AND COLLAPSIBLE TRIANGULATED TENSION SUPPORT STRUCTURE

[76] Inventors: Donald Lang, 382 Franklin St.; Joseph S. Shortlidge, 340 Franklin St., both of Cambridge, Mass. 02139

[21] Appl. No.: 695,906

[22] Filed: Jan. 29, 1985

[51] Int. Cl.[4] ........................................... F16M 11/32
[52] U.S. Cl. ...................... 248/165; 108/111; 182/182; 211/186; 211/189
[58] Field of Search ................ 248/188.91, 165, 166, 248/440; 211/187, 186, 189, 190, 195; 52/657, 695, 40; 182/182; 297/441; 108/111

[56] References Cited

U.S. PATENT DOCUMENTS

| | | | |
|---|---|---|---|
| 1,172,355 | 2/1916 | Guest | 248/165 X |
| 1,256,279 | 2/1918 | Wanamaker | 248/166 |
| 1,931,118 | 10/1933 | Rowland | 248/165 |
| 2,081,602 | 5/1937 | Rubenstein | 248/127 X |
| 2,186,484 | 1/1940 | Gunther | 182/182 X |
| 2,550,793 | 5/1951 | Ferriera | 248/163 X |
| 2,589,269 | 3/1952 | Magnuson et al. | 211/186 X |
| 2,724,511 | 11/1955 | Morgan | 211/181 X |
| 2,794,496 | 6/1957 | Strand, Jr. | 248/165 |
| 3,303,936 | 2/1967 | Barnawell | 211/187 X |
| 3,384,332 | 5/1968 | Fenner et al. | 248/165 |
| 3,934,676 | 1/1976 | Rice | 182/182 |
| 3,967,327 | 7/1976 | Severson | 211/195 X |
| 4,331,312 | 5/1982 | LaVoe | 248/165 X |
| 4,354,437 | 10/1982 | Logan | 248/188.91 X |
| 4,415,150 | 11/1983 | Iezza | 248/165 X |

OTHER PUBLICATIONS

Hughes Bulletin, #15, "Type C 1077 Tangent Structure," 1948.

Primary Examiner—J. Franklin Foss
Assistant Examiner—David L. Talbott
Attorney, Agent, or Firm—Richard J. Birch

[57] ABSTRACT

An adjustable and collapsible triangulated tension support structure having a generally H-shaped planar configuration. Two vertical members are connected to a horizontal compression member and flexible diagonally crossed tension members extend from one vertical member to the other below the compression member. An adjustable tension member is connected to both vertical members at points located above the horizontal compression member so that tensioning of the adjustable tensioning member spreads apart the portion of the vertical member located below the horizontal compression member thereby putting the diagonally crossed tensioning member under tension. At least one horizontal shelf bracket is connected to and extends outwardly from the upper portion of each vertical member to define a supporting surface for electronic apparatus. The structure can be collapsed for transportation by moving the vertical members together in an adjacent configuration.

18 Claims, 7 Drawing Figures

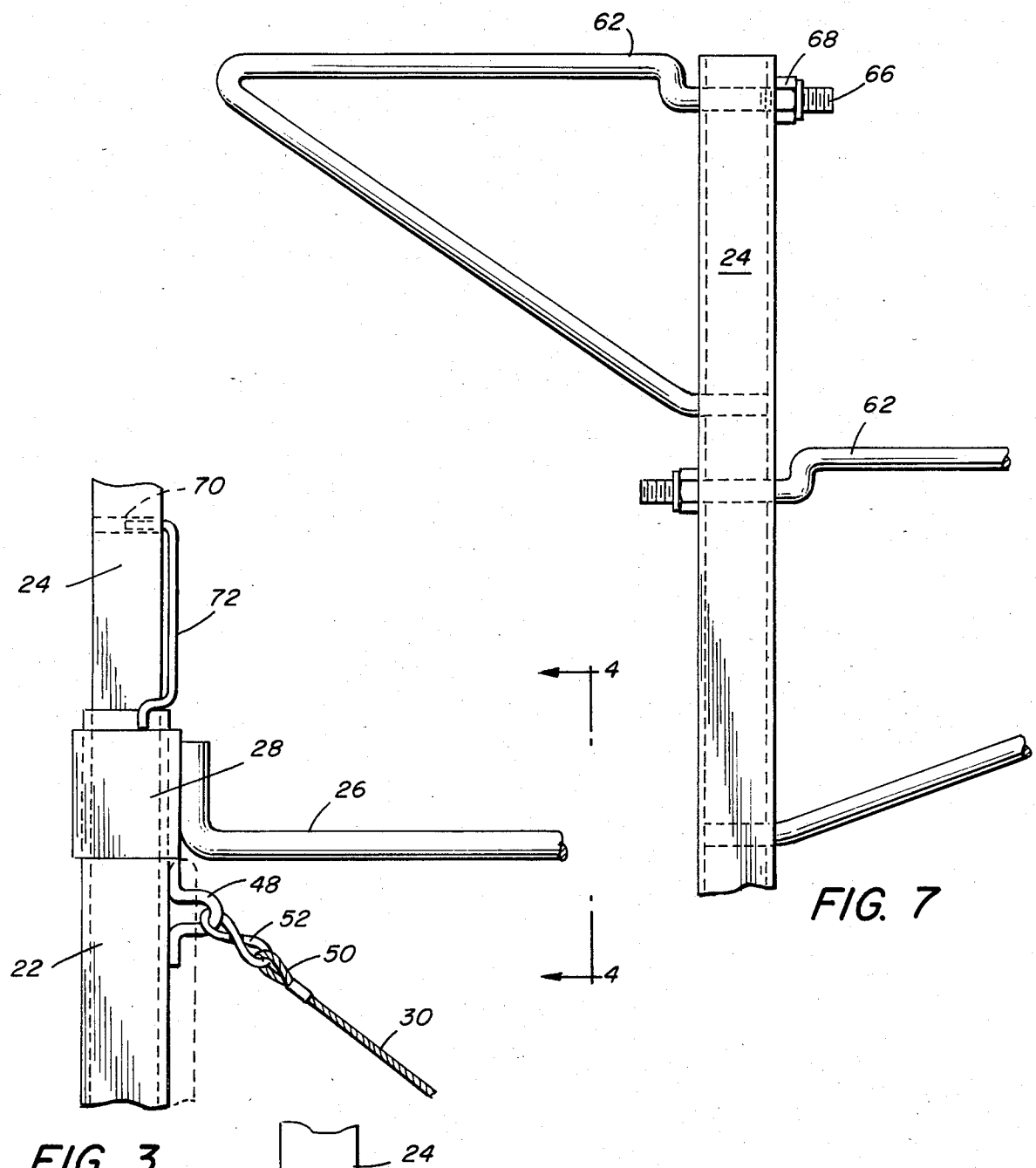
FIG. 7
FIG. 3
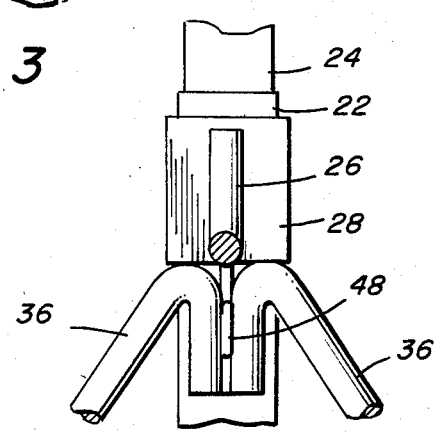
FIG. 4

ADJUSTABLE AND COLLAPSIBLE TRIANGULATED TENSION SUPPORT STRUCTURE

BACKGROUND OF THE INVENTION

The present invention relates to support structures in general, and more particularly, to an adjustable and collapsible triangulated tension support structure.

Musical groups travel from engagement to engagement with a variety of musical instruments and associated equipment. For example, many groups use microphones, mixers, amplifiers, equalizers, speakers and other electronic equipment during their performances. In addition to conventional musical instruments, electronically synthesized music has become an integral part of many musical performances. Electronic music synthesizers typically include one or more keyboards to provide a variety of electronically created sounds. During a performance, the synthesizer keyboards must be firmly supported at a convenient height for the musician. Since travel, set-ups and take-downs are almost a mandatory concomitant of today's musical scene, providing a suitable support surface for keyboard type electronic synthesizers presents a major problem.

It is accordingly a general object of the present invention to provide an adjustable and collapsible triangulated tension support structure.

It is a specific object of the invention to provide such a structure that is easily set up before a performance and taken down after a performance.

It is another object of the invention that the structural elements while under tension after assembly provide a lightweight, yet rigid, structure and support surface.

It is a feature of the invention that the support structure can be collapsed into a relatively small package without sacrificing the rigidity and strength of the structure when it is assembled.

It is another feature of the invention that the height of the support surface or surfaces can be varied to accomodate a musician's preference without sacrificing the strength of the tension support structure.

BRIEF DESCRIPTION OF THE INVENTION

The adjustable and collapsible tension support structure of the present invention utilizes two upright members or lever arms connected to a horizontal compression member to form a generally H-shaped planar structure. Two flexible tension members extend in diagonally crossed X-shaped pattern from one lever arm to the other and vice versa. The two tension members are located below the horizontal compression member. An adjustable tension member extends between and is connected to the upper portions of the two lever arms. Thus, by tensioning the upper tension member, the lower portions of the lever arms are spread apart and the two flexible diagonally crossed tension members are put in tension. Each lever arm or upright has a triangular-shaped leg lying in a plane substantially normal to the plane of the H-shaped structure. At least one shelf bracket is connected to and extends outwardly from each lever arm above the horizontal compression member. The two shelf brackets form a support surface for an electronic musical instrument or other apparatus.

DESCRIPTION OF THE DRAWINGS

The objects and features of the invention set forth above and other objects and features can best be understood from a detailed description of a preferred embodiment of the invention selected for purposes of illustration and shown in the accompanying drawings in which:

FIG. 3 is another view in front elevation showing in detail the telescoping portions of the upright, the collar and horizontal compression member;

FIG. 4 is a view taken along lines 4—4 in FIG. 3 showing the relationship of the telescoping upright tubes, collar, horizontal compression member and the triangular leg;

DETAILED DESCRIPTION OF THE INVENTION

Figure 1:
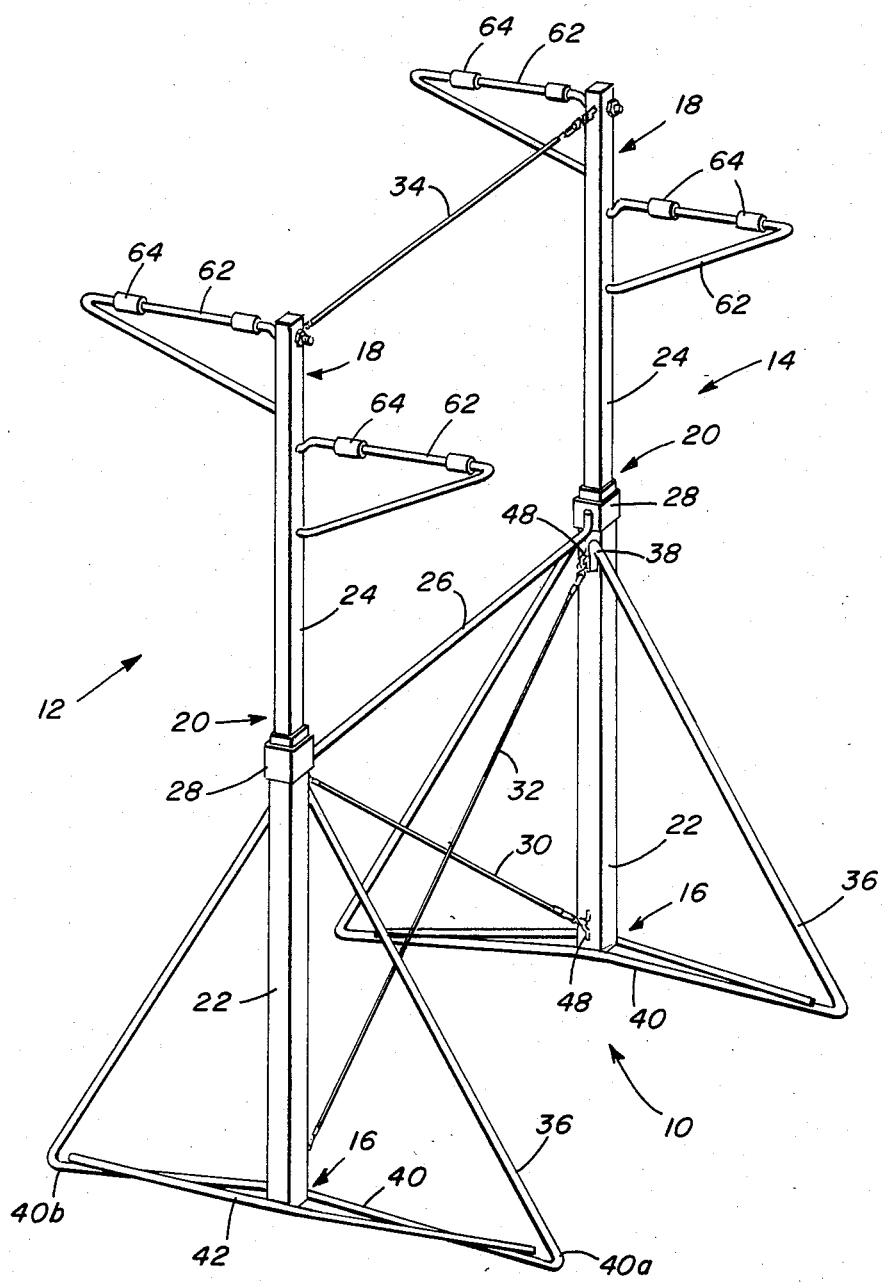
FIG. 1 is a perspective view of the support structure.

Turning now to the drawings, and particularly to FIG. 1 thereof, there is shown in perspective view an adjustable and collapsible tension structure constructed in accordance with the present invention and indicated generally by the reference numeral 10. The tension structure 10 comprises two uprights indicated generally as 12 and 14, each of which has a base portion 16, an upper end portion 18 and an intermediate portion 20.

In the preferred embodiment, the uprights or lever arms 12 and 14 are formed from two telescoping nested tubes; a lower tube 22 and an upper tube 24. Extending between the uprights 12 and 14 is a horizontal compression member 26 that is connected to the uprights by means of collars 28 that are secured to the horizontal compression member 26.

Figure 2:
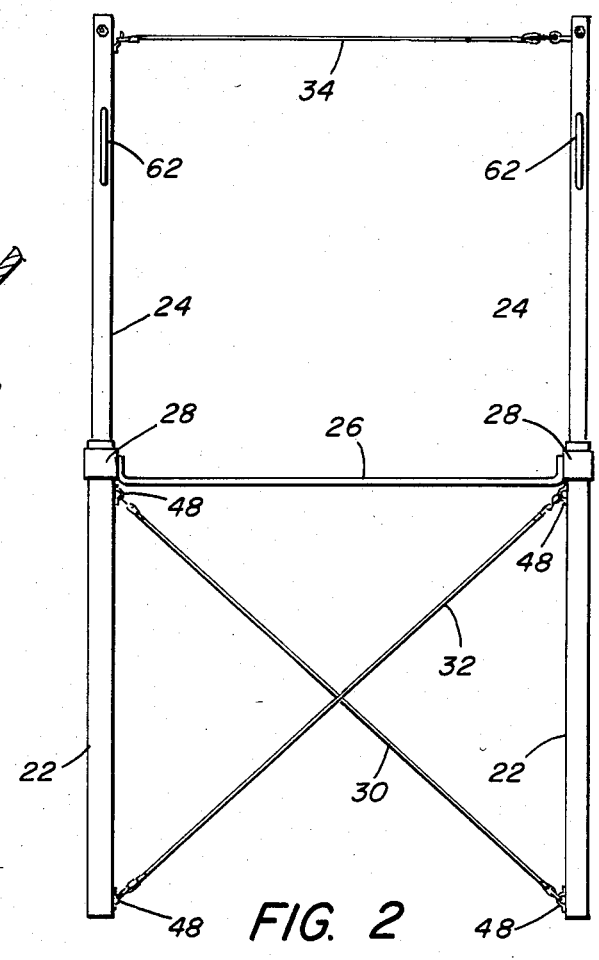
FIG. 2 is a view in front elevation of the structure with the triangular legs removed for purposes of clarity.

Referring to FIGS. 1 and 2, diagonally crossed tension members 30 and 32 extend from the intermediate portion 20 of one upright to the base portion 16 of the other upright. An adjustable tension member 34 extends between and is connected to the upper end portions 18 of the two uprights 12 and 14. Thus, by tensioning member 34, the base portions 16 of the upright members 12 and 14 will be spread apart putting tension members 30 and 32 under tension. It will be appreciated at this point in the description of the invention that the uprights 12 and 14, horizontal compression member 26, tension members 30 and 32 and the adjustable tension member 34 form a generally H-shaped planar structure. As shown in FIG. 1, the plane of this generally H-shaped structure has been depicted as though it were at 60-degrees to the plane of the drawing.

Each upright has a triangular leg 36 with an apex 38 and a base 40. The base 40 is secured to the base portion 16 of the corresponding upright. In addition, for maximum stability, a strut 42 also is secured to the base portion of each upright and to the tip portions 40a and 40b of the triangular leg 36. Each triangular leg lies in a plane substantially normal to the plane of the H-shaped planar structure.

Figure 5:
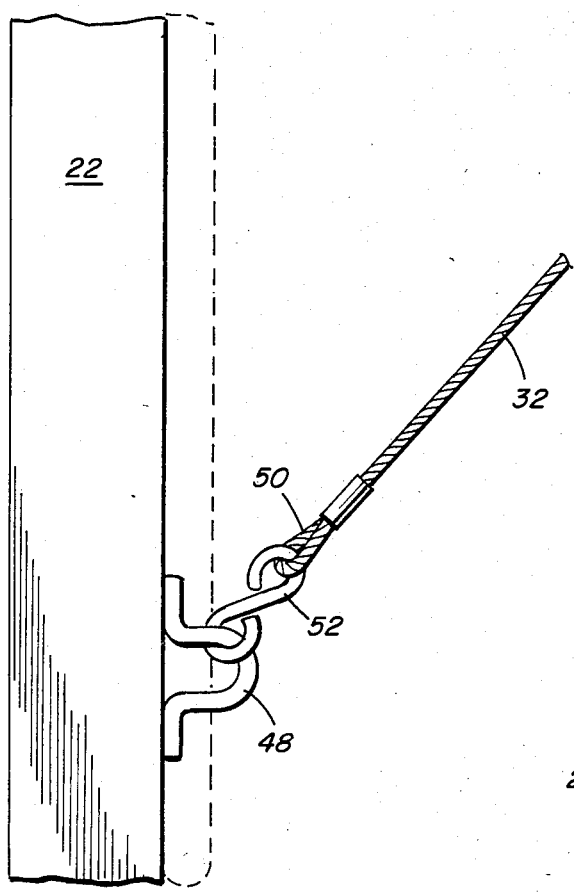
FIG. 5 is a view in front elevation of a part of the upright showing the attachment of one of the diagonally crossed tension members with the leg member shown in dotted form for purposes of clarity.

Looking now at FIGS. 1 through 5, the tension members 30 and 32 are formed from flexible wire cable and are secured to wire cable anchors 48 located on each upright. The flexible tension cables 30 and 32 each have a swaged cable loop 50 formed at the ends thereof. Connection of the wire cable loops 50 to the cable anchors 48 is provided through S-hooks 52 as best seen in FIGS. 3 and 5.

Figure 6:
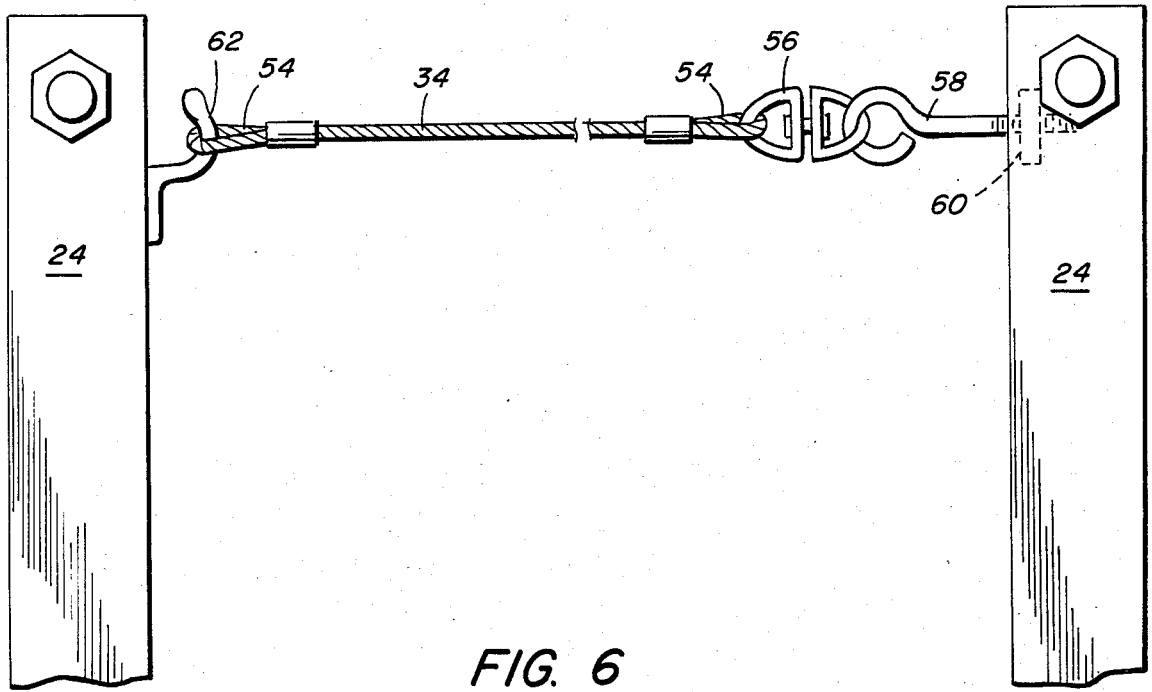
FIG. 6 is a view in front elevation of the upper portion of the upright structure showing the configuration of the adjustable tension member; and, FIG. 7 is a view in side elevation showing two shelf brackets connected and extending outwardly from the upright.

Referring to FIG. 6, the adjustable tension member 34 is removably connected to at least one of the uprights. The adjustable tension member 34 is formed from a flexible cable having swaged end loops 54. The right hand loop 54, as viewed in FIG. 6, is connected to a swivel 56 which in turn is connected to an eye-bolt 58 that is threaded into a weld nut 60. The left hand loop as viewed in FIG. 6 of the adjustable tension member 34 is looped over a hook 62 mounted on the left hand upright tube 24. Given this configuration, it can be seen that the tension exerted by tension member 34 upon the two upright nested tubes 24 can be varied without twisting the cable 34.

It will be appreciated that as the tension between the upper tubes 24 is increased by drawing the tubes closer together through the adjustment of tension member 34, the base portions 16 (the lower ends of lower tubes 22) are spread apart thereby putting the flexible tension members 30 and 32 under tension. At this point, the adjustable and collapsible tension support 10 provides a rigid structure for any electronic component or other apparatus that may be placed on triangular shelf brackets 64 that are connected to and extend outwardly from the upper tubes 24 as best seen in FIGS. 1, 2 and 7. Preferably, each shelf bracket 62 has one or more rubber or plastic collars 64 that provide a non-skid surface for and protect the bottom surface of any electronic apparatus placed on the shelf brackets. The shelf brackets 62 have a threaded end portion 66 so that the bracket can be secured to the upper tube 24 by means of a nut 68. Note that in FIG. 7, the collars 64 have been omitted for purposes of clarity.

One of the features of the tension structure of the present invention is that the height of the shelf brackets 62 can be adjusted by varying the length of the upper nested tube 24. Referring to FIG. 3, each upper nested tube 24 has a plurality of holes 70 (one of which is shown in FIG. 3). A wire pin 72 is inserted into the proper hole to provide height adjustment, i.e., length adjustment, of the upper tube 24. This pin 72 is secured in place by snapping its second end into the next higher hole 70.

It has been previously mentioned that another of the features of the invention is the relative ease in which the support structure can be set up and taken down. Since the support structure 10 is shown in the drawings in assembled form, the disassembly of the structure will be described. However, it should be understood that the assembly process is essentially the reverse of the process described below.

Referring to FIGS. 1 through 4 and 6, the "take down" disassembly operation is performed in the following manner. First, the tension is relieved on adjustable tension member 34 by screwing eye-bolt 58 outwardly (to the left as viewed in FIG. 6) thereby releasing the tension on cable 34 so that loop 54 can be slid off of hook 62. At this point, the upper nested tubes are withdrawn from the lower tubes 22. The horizontal compression member 26 with its attached collars 28 is then lifted upwardly until the collars 28 clear the lower tubes 22. The upright lower tubes 22 can then be moved toward each other until they are in an adjacent relationship. The upper tubes 24 together with the compression member 26 with its attached collars 28 are stored together with the lower tube and leg assembly in a compact configuration.

Having described in detail a preferred embodiment of our invention it will now be obvious to those skilled in the art that numerous modifications can be made therein without departing from the scope of the invention as defined in the appended claims. For example, although the adjustable tension member 34 is shown as a flexible cable, the tension member can be a solid rod pivotally secured to one of the upright tubes 24 with an eye-bolt length adjusting, and therefore, tension adjusting element.

It will be appreciated that the lever arms (uprights 12 and 14) are by far the most pronounced parts of the structure in their large and structurally articulated cross-sections. This is because they must bear the same dynamic forces as the compression and tension members, but must resist those forces as levers rather than as axial load bearing members. Because of their resultant large cross-sections the lever arms are by far the ablest of the structure's elements to carry additional compression forces.

The lever arms are also able to carry additional moment forces, as long as those forces are not largely in the same direction as the tension moment forces on the lever arms and do not twist the lever arms out of a common plane. The moment forces due to the tension are solely inward on each lever arm. Thus each lever arm has additional moment bearing structure in three more directions due to its square cross-section.

What we claim and desire to secure by Letters Patent of the United States is:

1. A triangulated tension support structure comprising:
   a first linear means having a base portion, an end portion and an intermediate portion therebetween;
   a second linear means having a base portion, an end portion and an intermediate portion therebetween;
   a linear compression means positioned between and connected to the intermediate portion of said first and second linear means to form therewith a generally "H"-shaped planar structure and with each such connection permitting rotational movement of the corresponding linear means about a rotational axis normal to the plane of said generally "H"-shaped structure;
   a first tensioning member connected between the intermediate portion of said first linear means and the base portion of said second linear means;
   a second tensioning member between the intermediate portion of said second linear means and the base portion of said first linear means, said first and second tensioning members diagonally crossing each other in a generally "X" configuration and lying in the plane formed by said first and second linear means and said linear compression means; and,
   an adjustable tensioning member extending between and connected to the end portions of said first and second linear means whereby the tensioning of said adjustable tensioning member produces rotation of each one of said linear means about its rotational axis to spread apart the base portions of said first and second linear means thereby putting said diagonally crossed first and second tensioning members under tension and said linear compression means under compression to produce a rigid structure without slack between and among the components thereof.

2. A triangulated tension support structure comprising:
- a first upright means having a lower portion, an upper portion and an intermediate portion therebetween;
- a second upright means having a lower portion, an upper portion and an intermediate portion therebetween;
- a horizontal compression means positioned between and connected to the intermediate portion of each of said first and second upright means to form therewith a generally "H"-shaped planar structure and with each such connection permitting rotational movement of the corresponding linear means about a rotational axis normal to the plane of said generally "H"-shaped structure;
- a first tensioning member connected between the intermediate portion of said first upright means and the lower portion of said second upright means;
- a second tensioning member connected between the intermediate portion of said second upright means and the lower portion of said first upright means, said first and second tensioning members diagonally crossing each other in a generally "X" configuration and lying in the plane formed by said first and second upright means and said horizontal compression means; and,
- an adjustable tensioning member extending between and connected to the upper portions of said first and second upright means whereby the tensioning of said adjustable tensioning member produces rotation of each one of said upright means about its rotational axis to spread apart the lower portions of said first and second upright means thereby putting said diagonally crossed first and second tensioning members under tension and said horizontal compression means under compression to produce a rigid structure without slack between and among the components thereof.

3. The triangulated tension support structure of claim 2 wherein said horizontal compression means is removably connected to said first and second upright means, said first and second tensioning members are flexible and said adjustable tensioning member is removably connected to at least one of said upright means whereby said generally H-shaped, planar structure can be collapsed so that the first and second upright means are positioned adjacent to each other.

4. The triangulated tension support structure of claim 2 further comprising:
- A. a first triangular leg means having an apex and a base portion, said first triangular leg means being connected to the intermediate portion of the first upright means at the apex of the triangular leg means and to the lower end of the first upright means at the base portion of the triangular leg means, said first triangular leg means lying in a plane generally normal to the plane of the generally H-shaped planar structure;
- B. a second triangular leg means having an apex and a base portion, said second triangular leg means being connected to the intermediate portion of the second upright means at the apex of the triangular leg means and to the lower end of the second upright means at the base portion of the triangular leg means, said second triangular leg means lying in a plane generally normal to the plane of the generally H-shaped planar structure.

5. The triangulated tension support structure of claim 4 wherein the base portion of each triangular leg means is bowed upwardly so that when the support structure is positioned on a horizontal supporting surface the corresponding upright means lower portion connected thereto does not contact the horizontal supporting surface.

6. The triangulated tension support structure of claim 2 further comprising at least one horizontal shelf bracket means connected to and extending outwardly from the intermediate and/or upper portion of said first upright means and at least one horizontal shelf bracket means connected to and extending outwardly from the intermediate and/or upper portion of said second upright means with both of said shelf bracket means lying in a common horizontal plane.

7. The triangulated tension support structure of claim 2 wherein said first and second upright means include means for varying the height of each such upright means.

8. The triangulated tension support structure of claim 7 wherein the means for varying the height of each upright means controls the length of the upright means located above the horizontal compression member.

9. The triangulated tension support structure of claim 2 wherein said first and second upright means each comprise a lower tube and an upper tube, said upper tube being adapted for telescopic engagement with its corresponding lower tube whereby said upper and lower tubes can be disengaged to reduce the overall length of the upright means.

10. The triangualated tension support structure of claim 2 further comprising at least one support means attached to one of said upright means for supporting an item.

11. The triangulated tension support structure of claim 2 further comprising at least one bracket means connected to and extending outwardly from one of said upright means.

12. The triangulated tension support structure of claim 3 further comprising:
- A. a first triangular leg means having an apex and a base portion, said first triangular leg means being connected to the intermediate portion of the first upright means at the apex of the triangular means and to the lower end of the first upright means at the base portion of the triangular leg means, said first triangular leg means lying in a plane generally normal to the plane of the generally H-shaped planar structure;
- B. a second triangular leg means having an apex and a base portion, said second triangular leg means being connected to the intermediate portion of the second upright means at the apex of the triangular leg means and to the lower end of the second upright means at the base portion of the triangular leg means, said second triangular leg means lying in a plane generally normal to the plane of the generally H-shaped planar structure.

13. The triangulated tension support structure of claim 12 wherein the base portion of each triangular leg means is bowed upwardly so that when the support structure is positioned on a horizontal supporting surface the corresponding upright means lower portion connected thereto does not contact the horizontal supporting surface.

14. The triangulated tension support structure of claim 3 further comprising at least one horizontal shelf bracket means connected to and extending outwardly from the intermediate and/or upper portion of said first upright means and at least one horizontal shelf bracket means connected to and extending outwardly from the intermediate and/or upper portion of said second upright means with both of said shelf bracket means lying in a common horizontal plane.

15. The triangulated tension support structure of claim 3 wherein said first and second upright means include means for varying the height of each such upright means.

16. The triangulated tension support structure of claim 15 wherein the means for varying the height of each upright means controls the length of the upright means located above the horizontal compression means.

17. The triangulated tension support structure of claim 3 wherein said first and second upright means each comprise a lower tube and an upper tube, said upper tube being adapted for telescopic engagement with its corresponding lower tube whereby said upper and lower tubes can be disengaged to reduce the overall length of the upright means.

18. The triangulated tension support structure of claim 3 further comprising at least one bracket means connected to and extending outwardly from one of said upright means.

* * * * *